June 6, 1933.     B. MENGELE     1,912,907
POLYPHASE SYSTEM
Filed Jan. 11, 1930     2 Sheets-Sheet 1

INVENTOR
*Benno Mengele.*
BY
*Chesley G. Carr*
ATTORNEY

June 6, 1933.  B. MENGELE  1,912,907
POLYPHASE SYSTEM
Filed Jan. 11, 1930   2 Sheets-Sheet 2

INVENTOR
Benno Mengele.
BY
Chesley G. Carr
ATTORNEY

Patented June 6, 1933

1,912,907

UNITED STATES PATENT OFFICE

BENNO MENGELE, OF VIENNA, AUSTRIA, ASSIGNOR TO WESTINGHOUSE ELECTRIC & MANUFACTURING COMPANY, A CORPORATION OF PENNSYLVANIA

POLYPHASE SYSTEM

Application filed January 11, 1930, Serial No. 420,224, and in Austria January 11, 1929.

My invention relates to improvements in systems of connection for segregating the components of the same or opposite phase rotation of polyphase systems.

It is well known in the art that any unsymmetrical polyphase system may be resolved into two symmetrical polyphase systems, one of which systems has the same phase rotation as the unsymmetrical system and the other the opposite phase rotation.

In order to obtain the system of the same or opposite phase sequence by itself (by segregating or isolation) for measuring purposes, relay operation and so on, it is known to employ a polyphase motor with synchronously rotating squirrel-cage rotor. This arrangement has, however, the drawback that the slots of the machine cause numerous higher harmonics of considerable amplitude which adversely affect the measurements or readings. Another known system or method for sifting or isolating the systems of the same or opposite phase sequence consists of a special system of connections of choke coils or capacitances and ohmic resistances.

It is an object of my invention to provide a novel phase-sequence system of the latter type which shall be substantially free from errors caused by small variations of frequency.

Other objects of my invention will become evident from the following detailed description taken in conjunction with the accompanying drawings, in which.

Figure 1:
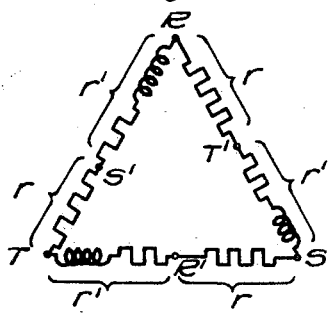
Fig. 1 is a diagrammatic view of a phase-sequence network of the prior art.
Figure 2:
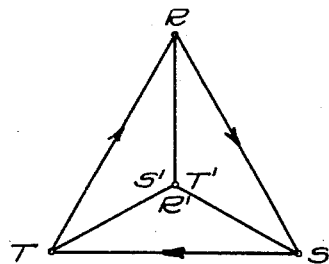
Figs. 2 and 3 are vector diagrams illustrating the operation of the apparatus shown in Fig. 1.

Referring to Fig. 1 of the drawings, which shows a static phase-sequence voltage network of the prior art, the conductors of a three-phase alternating-current system are indicated diagrammatically at R, S and T. Between any two phase lines are connected in series the impedances $r$ and $r'$. The impedance $r$ is an ohmic resistance, the impedance $r'$ consists of an ohmic resistance which is equal to $\frac{1}{2} r$ and an inductive impedance the ohmic value of which is equal to $\frac{1}{2}\sqrt{3}r$. In this way the voltage prevailing between two phase lines is resolved into two components which in the voltage triangle correspond with the connecting lines of the respective corner points with the centroid of the triangle. This voltage triangle is shown in Fig. 2 of the drawings. If a symmetrical voltage system with the phase sequence R, S, T in clockwise direction of rotation is connected to the three phase lines, the points R', S', T' have the same potential in correspondence with the centroid of the voltage triangle. Voltmeters connected between the points R', S' and S', T' as well as T', R' in Fig. 1 of the drawings indicate zero.

Figure 3:
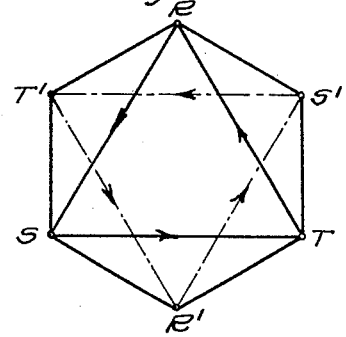

If a symmetrical voltage system of the opposite phase sequence or sequence T, S, R and the same connection of the resistances is connected to the three prases R, S, T, the voltage components between any two phase lines in the voltage triangle are located outside, as shown in Fig. 3 of the drawings. Between the points R', S', T' is obtained a voltage system of equal size as the system T, S, R.

If thus at the three lines there exists a (clockwise rotation) voltage system R, S, T, as well as a voltage system of opposite phase sequence (counter-clockwise) T, S, R, only the system T, S, R of opposite phase sequence will appear at the points R', S', T'. In this case the system of opposite phase sequence is segregated or isolated and the system of the same phase sequence is suppressed.

If on the other hand, the system of the same phase sequence is to be segregated it is only necessary to interchange the resistances $r$ and $r'$. In this case the system of opposite phase sequence is suppressed and only the system of the same phase sequence indicated.

The above described known system of connection has, however, the defect that its indications are correct so long only as the frequency maintains a definite value. If the frequency varies, a fact which must always be reckoned with in practice, the ratio between the resistances $r$ and $r'$ is disturbed and the system of connection supplies incorrect readings.

My invention consists of a system of connections in which the size and the arrangement of the resistances is so chosen that the influence of variations in the frequency on the indication of the system component of the same or opposite phase sequence over a certain frequency range is suppressed or only very small.

In practicing my invention, the values and arrangement of the resistances and inductances are so chosen that the segregated voltage (or current) combines with the voltage (or current) of the polyphase system to supply a proper voltage (or current) for the indicating instrument. This choice is so made that for a certain range of frequency variations the measuring voltage (or current) of the system to be segregated is of substantially constant magnitude and is phase displaced under certain circumstances. The voltages (or currents) of the system which is not adapted to be segregated are such as to substantially mutually neutralize one another or to result in only a small residual component.

Figure 4:
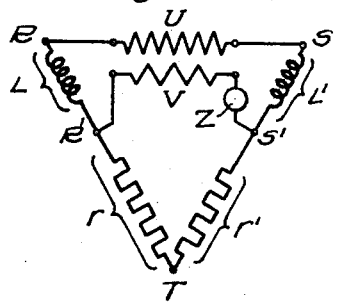
Fig. 4 is a diagrammatic view of a phase-sequence network embodying my invention.

An embodiment of my invention for sifting the voltage component of the same or opposite phase sequence in a three-phase system is shown in Fig. 4 of the drawings. R, S, T are the three phase lines; the phase line T is connected with the two other phase lines R and S across a potential divider which consists of an ohmic impedance $r$ and $r'$, respectively, and an inductance L and L', respectively. Between the two tapping points R' and S' of the potential divider is connected the secondary winding V of a transformer the primary winding U of which is located between the phase lines R and S. Z is an ammeter.

Figure 5:
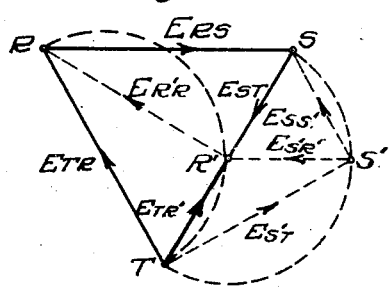
Figs. 5 and 6 are vector diagrams illustrating the operation of the apparatus shown in Fig. 4.

Fig. 5 of the drawings shows the voltage polygon for the system of the same phase sequence in this connection system. The reference letters of the voltage vectors indicate the points in the system of connections between which the respective voltage develops, for instance $E_{RS}$ is the voltage between the points R and S. The potential of the tapping points R' and S' corresponds with the apex of the respective voltage triangle which must be located on a semi-circle each over $E_{TR}$ or $E_{ST}$ respectively. By choosing the resistance ratio $\frac{\omega L}{r} = \tan \psi$ and the resistance ratio $\frac{\omega L'}{r'} = \tan\left(\psi - \frac{\pi}{6}\right)$ wherein $\psi$ is approximately $\frac{\pi}{3}$ the result is obtained that the vector of voltage between the tapping points R' and S' of the potential divider $E_{S'R'}$ is located parallel to the voltage vector $E_{RS}$. $E_{S'R'}$ must then simultaneously also be half of $E_{RS}$.

If the voltmeter U—V has a transformation ratio of 2:1, the connection of the secondary winding V between the points R' and S', as shown in Fig. 4, results in a voltage equal to one-half the voltage $E_{RS}$ being impressed across the points R' and S'. As explained above, the voltage across the points R' and S' is equal to $E_{S'R'}$ and is equal in magnitude to one-half the voltage $E_{RS}$. Referring to the diagram of Fig. 5, it may be noticed that the voltage $\frac{1}{2}E_{RS}$ and $E_{S'R'}$ are equal in magnitude and oppose each other. Therefore, the voltmeter Z in Fig. 4 indicates zero. The system of the same phase sequence R S T is thus completely suppressed at rated frequency. When the frequency changes, the points R' and S' become displaced in the voltage diagram in the same direction, i. e. the voltage vector $E_{S'R'}$ becomes displaced substantially parallel to itself and remains substantially equal to $\frac{1}{2}E_{RS}$ because the centers of the two semicircles are $\frac{1}{2}E_{RS}$ apart.

Even if the frequency of the system having phase lines R, S, T changes, the system of the same phase sequence is almost entirely suppressed in case of not too excessively great frequency changes. In the event of greater frequency changes the system of the same phase sequence is suppressed to a very extensive extent. Any frequency changes, therefore, result in only a very minute error in the measurement of the system of opposite phase sequence (which, for instance, is to be indicated in the present case).

Figure 6:
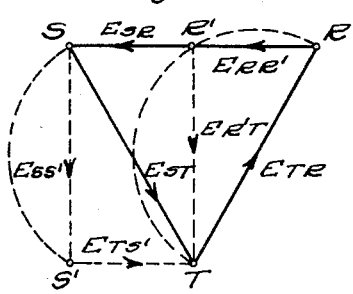

For segregating the system of opposite phase sequence $E_{SR}$ the voltage diagram is shown in Fig. 6 of the drawings. This is simply produced by folding the voltage triangles over $E_{TR}$ and $E_{ST}$ according to Fig. 5 out of the plane of the drawings through an angle of 180°. In this case only the voltage $E_{TR'}$ is indicated on the voltmeter Z at rated frequency while the voltages $E_{TS}$ and $\frac{1}{2}E_{SR}$ (at the transformer) neutralize each other. The voltage $E_{TR'}$ is approximately $\frac{1}{2}\sqrt{3}$ of the interlinked voltage and served as measuring value for the system of opposite phase rotation. Here also nothing is changed in the value of the voltage resulting from the voltages $E_{TR'}$, $E_{TS'}$ and $\frac{1}{2}E_{RS}$ (the measuring value for system to be segregated) in case of not too excessively great frequency change, it changes its phase position only.

The voltmeter Z will indicate an approximately constant voltage magnitude in accordance with the system which is to be segregated. For certain frequency changes, the value of this voltage remains substantially constant and is only changed in phase position, while only a small voltage residue of the system which is to be isolated is also indicated in the voltmeter Z.

Figure 7:
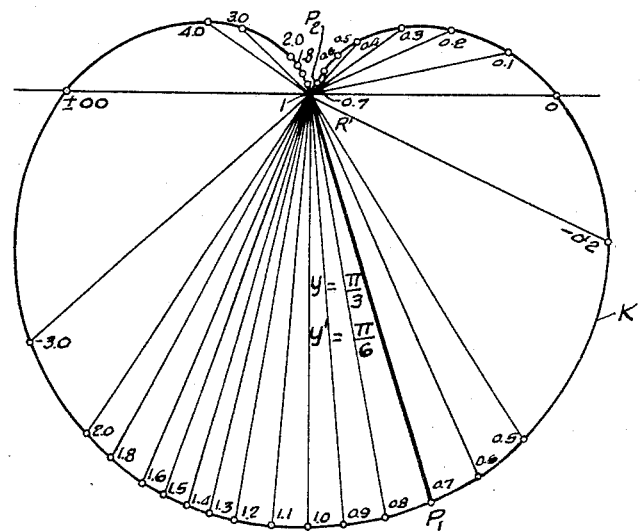
Figs. 7 to 9 are curve diagrams showing the relationship of variables involved in the operation of the apparatus shown in Fig. 4.

Assuming the relations $\frac{\omega L}{r} = \tan \frac{\pi}{3}$ and $\frac{\omega L'}{r'} = \tan \frac{\pi}{6}$ for the rated normal frequency, accordance to the diagrams of Figs. 5 and 6 the resulting voltage is determined for each system and the diagram shown in Fig. 7 may be obtained. The distance $R' P_1$ in this diagram corresponds with the distance $R' T$ in Fig. 6 and represents at rated frequency the voltage of the system to be segregated which is directly readable at the voltmeter. If the resulting voltages of each system according to value and phase at the various frequency variations (referred to the rated frequency as unit) are plotted from R', the end point of these vectors is located on the curve K. The voltage vector $R' P_1$ of the system to be segregated and the voltage vector $R' P_2$ of the system to be suppressed correspond, for instance, with a frequency of 0.7 of the rated frequency. The part of the curve K located below the horizontal reference line corresponds with the system to be segregated and the part of the curve K located above this axis corresponds with the system to be suppressed.

Both systems are assumed to be of equal magnitude. Even under this assumption the error member (voltage component $R' P_2$) originating from the system to be suppressed is very small in the voltage actually measured and, on account of its phase position, is of hardly any influence on the total amount of voltage impressed on the voltmeter Z. In the event of not excessively great frequency variations it is even possible to isolate successfully a system of lower voltage from a system of higher voltage in a practical manner. The conditions are naturally most favorable when the system to be suppressed is smaller than the system to be segregated.

Figure 8:
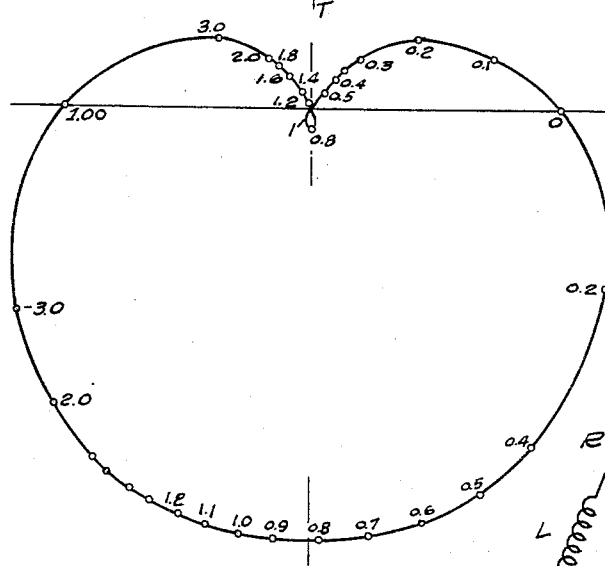

From the diagram it is obvious that the error originating from the system to be suppressed at an equal difference of the frequency from the rated value increases quicker in case of a frequency decrease than in case of a frequency increase. This may be changed by choosing $\psi$ slightly smaller than $\frac{\pi}{3}$. Fig. 8 shows a diagram corresponding substantially with Fig. 7 but which is based upon the resistance ratio $\frac{\omega L}{r} = \tan \psi = 1.46$ and $\frac{\omega L'}{r'} = \tan \psi' = 0.48$. Here the point $R^1$ Here the point $R^1$ is not a reversal point but an intersection.

Figure 9:
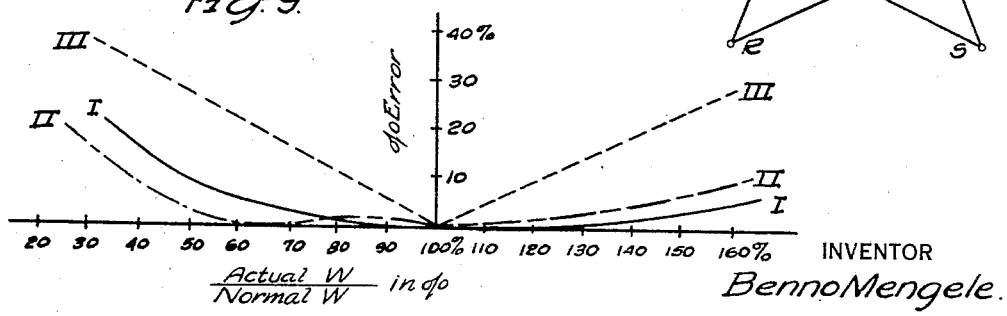

Fig. 9 shows the error originating from the system to be suppressed referred to the actual size of this system component in dependence of the frequency. On the abscissa is plotted the frequency in percentages of the rated frequency, on the ordinate the measuring error in percentages of the actual symmetrical component. The curve I corresponds with the embodiment of the invention described at $\tan \psi = \tan \frac{\pi}{3}$ and $\tan \psi' = \tan \frac{\pi}{6}$ (diagram Fig. 7), the curve II with the same embodiment at $\tan \psi = 1.46$ and $\tan \psi' = 0.48$ (diagram Fig. 8), the curve III corresponds with the known arrangement according to Fig. 1.

From Fig. 9 it is obvious that according to my invention the measuring error caused by frequency changes can be suppressed entirely or at least be kept very small within a certain frequency range, in contrast with known systems of connection. By the choice of the resistance ratios $\frac{\omega L}{r}$ and $\frac{\omega L'}{r'}$ it is possible to fix the errorless frequency range as required. Resistance conditions corresponding with curve I may, for instance, be chosen for measuring the degree of unsymmetry or for metering purposes as these produce no error in the event of small fluctuations around the rated frequency. For protective connections which in case of disturbances, i. e. in case of greater frequency changes, must operate correctly, resistance conditions corresponding with curve II would be preferable.

The measuring error for the system to be segregated consists almost of an angle error only throughout a substantial frequency range and does not become operative immediately when measuring voltages or currents alone. In the case of output or quotient measurements (of current and voltage) the voltage and current networks are, however, subject to the same angle error so that no adverse effect results.

It will be understood that my invention is by no means limited to the resistance conditions illustrated and described. They may also be chosen differently and the resistances may also be arranged in a different manner.

Figure 10:
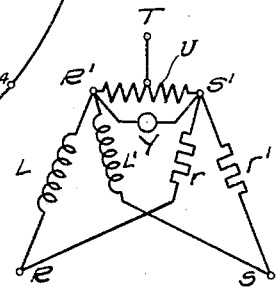
Fig. 10 is a diagrammatic view of a modification of my invention.

My invention may also be utilized for segregating the symmetrical current components. Fig. 10 of the drawings shows a corresponding arrangement which is a suitable adaptation of the voltage network according to Fig. 4. The phase lines R and S are connected to the respective terminals of a transformer U across an ohmic resistance $r$ and $r'$ respectively and an inductance L and L' respectively. The transformer U is connected at the middle thereof to a third phase T and functions as a current divider. The resistances $r$ and $r'$ are connected to one terminal of the transformer U and the inductances L and L' are connected to the other terminal. The ratios $\frac{\omega L}{r}$ and $\frac{\omega L'}{r'}$ may preferably be chosen with approximately $\tan\frac{\pi}{3}$ and $\tan\frac{\pi}{6}$, as in the case of the voltage network according to Fig. 4. An ammeter Y is connected between the connection points R' and S'. The current diagram for this system of connections corresponds with the voltage diagrams according to Figs. 5 and 6 respectively and the phase currents correspond with the phase voltages in those figures. The currents flowing together in the points R' and S' are the equivalent of the voltages at the resistances and at the transformer between R' and S' according to Figs. 5 and 6 respectively. The residual current from the terminal points R' and S' flowing into the ammeter corresponds with the residual voltage of the voltage network.

I claim as my invention:

1. In a system of connection for segregating the constituent components of the same or opposite phase sequence in a polyphase alternating-current circuit, the combination including reactive and ohmic impedances associated with said system, transforming means interposed between said system and said impedances and electroresponsive means associated with said impedances, the value and arrangement of the impedances being so chosen that the influence of frequency variations on the indication of components of the same or opposite phase sequence in said electroresponsive means is substantially suppressed over a predetermined frequency range.

2. In a system of connection for segregating the constituent components of the same or opposite phase sequence of an electrical quantity in a polyphase circuit, the combination including reactive and ohmic impedances associated with said system, transforming means interposed between said system and said impedances and electroresponsive means associated with said impedances, the value and arrangement of the impedances being so chosen that the partial quantities developing in said impedances combine with the like quantities of the polyphase system through a predetermined frequency range to effect a substantially constant resultant phase-displaced measuring value in said electroresponsive means of the system to be segregated and to substantially neutralize the corresponding quantities of the other system which is not being segregated.

3. In a system of connection for segregating the constituent components of the same or opposite phase rotation in a polyphase system, the combination including reactive and ohmic impedances associated with said system, one of the phase lines of said polyphase system being connected with the other two phase lines across potential dividers including a reactive and ohmic impedance, respectively, transforming means associated with said other two phase lines and means for impressing the secondary voltage of said transforming means across the connection points of the impedances in the respective potential dividers.

4. In a system of connection for segregating the constituent components of the same or opposite phase rotation in a polyphase system by means of reactive and ohmic impedances, the combination including a potential divider comprising a reactive and an ohmic impedance connected in series across one phase of said polyphase system, a second potential divider comprising a reactive and an ohmic impedance connected in series across a second phase of said polyphase system, transforming means connected across a third phase of said polyphase system and means for impressing the secondary voltage of said transforming means across the respective connection points of the series connected impedances in said potential dividers, the impedance ratio of one of said potential dividers to the impedance ratio of the other potential divider being as $\tan\psi$ to $\tan\left(\psi-\frac{\pi}{6}\right)$, where $\psi$ is substantially $\frac{\pi}{3}$.

5. In a system of connection for segregating the constituent components of the same or opposite phase rotation in a polyphase system, the combination including a potential divider comprising a reactive and an ohmic impedance connected in series across one phase of said polyphase system, a second potential divider comprising a reactive and an ohmic impedance connected in series across a second phase of said polyphase system, transforming means having a transformation ratio of two to one connected across a third phase of said polyphase system, and means for impressing the secondary voltage of said transforming means across the respective connection points of the series impedances in said potential dividers, the impedance ratio of said potential divider to the impedance ratio of said second potential divider being as tan $\psi$ to tan $\left(\psi - \frac{\pi}{6}\right)$, where $\psi$ is substantially $\frac{\pi}{3}$.

6. In a system of connection for segregating the symmetrical current components in a three-phase system, the combination including transforming means connected to one phase line of said system at a connection point intermediate the terminals of said transforming means, and inductive and ohmic impedance means connected across the other two phase lines of said system, and the terminals of said transforming means, respectively, said inductive and ohmic impedance means being so connected and arranged that the inductive means are connected to one terminal of said transforming means and the ohmic impedance means are connected to the other terminal of said transforming means.

7. In a system of connection for segragating the symmetrical current components in a three-phase system, the combination including transforming means connected to one phase line of said system at a connection point intermediate the terminals of said transforming means, and inductive and ohmic impedance means connected across the other two phase lines of said system, and the terminals of said transforming means, respectively, said inductive and ohmic impedance means being so connected and arranged that the inductive means are connected to one terminal of said transforming means and the ohmic impedance means are connected to the other terminal of said transforming means, the ratios of the inductive and ohmic impedances connected to each of said other two phase lines of said system being as tan $\psi$ to tan$\left(\psi - \frac{\pi}{6}\right)$, where $\psi$ is substantially $\frac{\pi}{3}$.

In testimony whereof I affix my signature.

BENNO MENGELE.